United States Patent [19]
Chin et al.

[11] Patent Number: 5,714,561
[45] Date of Patent: Feb. 3, 1998

[54] WATER-DISPERSABLE POLYURETHANES

[75] Inventors: James Chin; Vincent John Gajewski, both of Cheshire, Conn.

[73] Assignee: Uniroyal Chemical Company, Inc., Middlebury, Conn.

[21] Appl. No.: 715,904

[22] Filed: Sep. 23, 1996

[51] Int. Cl.$^6$ ...................................................... C08G 18/48
[52] U.S. Cl. ............................ 528/49; 528/71; 528/76; 252/182.22; 524/873; 524/874
[58] Field of Search ................................. 528/49, 76, 71; 252/182.22; 524/873, 874

[56] References Cited

U.S. PATENT DOCUMENTS

| | | | |
|---|---|---|---|
| 3,294,724 | 12/1966 | Axelrood | 260/29.2 |
| 3,412,054 | 11/1968 | Milligan | 260/18 |
| 3,479,310 | 11/1969 | Dieterich | 260/29.2 |
| 3,905,929 | 9/1975 | Noll | 260/29 |
| 4,092,286 | 5/1978 | Noll | 260/29 |
| 4,237,264 | 12/1980 | Noll | 528/67 |
| 4,764,553 | 8/1988 | Masbach et al. | 524/591 |

*Primary Examiner*—Rachel Gorr
*Attorney, Agent, or Firm*—Daniel Reitenbach

[57] ABSTRACT

Water-dispersible polyurethane prepolymers comprising one or more organic diisocyanates; a difunctional compound having a molecular weight of from about 250 to about 10,000 which is difunctionally reactive with the organic diisocyanate and which is free of side chain polyoxyalkylene units; and a dispersion diol which is difunctionally reactive with the organic diisocyanate and which contains side chain polyoxyalkylene units. Methods of preparation of the prepolymers and their use in aqueous polyurethane dispersions are also described.

21 Claims, No Drawings

WATER-DISPERSABLE POLYURETHANES

FIELD OF THE INVENTION

The present invention relates to improved water-dispersible polyurethane prepolymers and aqueous polyurethane dispersions prepared therefrom.

BACKGROUND OF THE INVENTION

Water-dispersible polyurethanes, or urethane latices, are known in the art. Generally, these latices are coagulated and molded into useful elastomeric products. In the past, numerous attempts to prepare films and coatings from urethane latices have failed for various reasons. Certain latices, upon casting and curing, do not form films. Others form films which crack upon drying rendering them useless. Still others form films of inferior mechanical strength for the end application needed.

U.S. Pat. No. 3,294,724 describes polyurethane prepolymers comprising an organic diisocyanate and a polymeric diol containing a branched polyoxyalkylene chain. The prepolymer is then combined with with an aqueous solution of a surfactant (emulsifier) and then chain extended with piperazine compounds, to form latices.

U.S. Pat. No. 3,412,054 describes polyurethane prepolymers prepared by reacting polyisocyanates with 2,2-hydroxymethyl-substituted carboxylic acids, to produce polyurethane prepolymers having pendant carboxyl groups. These polymers are then modified with a water soluble cation, to create a hydrophilic carboxylic acid salt such as a quaternary ammonium salt.

U.S. Pat. No. 3,479,310 describes the preparation of polyurethane dispersions containing from 0.02 to about 1% of a salt in which compounds with acid groups are incorporated into the polyurethane and then the acid groups are converted to the salt.

U.S. Pat. No. 3,905,929 describes a method for preparing a polyurethane prepolymer which comprises reacting an organic diisocyanate with a difunctional compound containing no polyoxyethylene side chain and with a dispersion diol containing a polyoxyethylene side chain, wherein the dispersion diol is prepared by reacting a dialkanolamine with a monoisocyanate containing a polyoxyethylene sidechain. Prepolymers prepared in this manner can have limited shelf life.

U.S. Pat. No. 4,092,286 describe water-dispersible polyurethane prepolymers which comprise both polyalkylene oxide polyether chains and certain ionic groups. Such prepolymers can have limited stability.

It is an object of this invention to provide a novel isocyanate (NCO) containing water-dispersible polyurethane prepolymer which can be stored for extended periods of time and therefore enjoy long shelf life. It is another object of this invention to provide aqueous polyurethane dispersions from these prepolymers without the necessity of external emulsifiers.

SUMMARY OF THE INVENTION

This invention relates to a process for producing a water-dispersible isocyanate-terminated polyurethane prepolymer, which comprises reacting:

a) at least one organic diisocyanate monomer;

b) a difunctional compound having a molecular weight of from about 250 to about 10,000 which is difunctionally reactive with organic diisocyanate monomer and which is free of side chain polyoxyalkylene units; and c) a dispersion diol which is difunctionally reactive with the organic diisocyanate monomer and which contains side chain polyoxyalkylene units, to produce the water-dispersible isocyanate-terminated polyurethane prepolymer.

This invention also relates to a water-dispersible isocyanate-terminated polyurethane prepolymer so prepared.

This invention further relates to a method for preparing an aqueous polyurethane dispersion, which method comprises reacting a) the water-dispersible isocyanate-terminated polyurethane prepolymer above; and b) a curative or chain-extender, in the presence of water, to produce the aqueous polyurethane dispersion.

This invention additionally relates to an aqueous polyurethane dispersion prepared by this method.

DETAILED DESCRIPTION OF THE INVENTION

For the purposes of this invention, the term "difunctionally reactive with the organic diisocyanate monomer" means comprising a reactive group containing two reactive hydrogen atoms as determined by the Zerewitinoff method.

Organic diisocyanate monomers useful in the method of this invention can be represented by the general formula $R(NCO)_2$ wherein R represents a $C_4$–$C_{12}$ alkyl or alkenyl, a $C_6$–$C_{15}$ cycloalkyl, $C_7$–$C_{15}$ aralkyl, or a $C_6$–$C_{12}$ aryl. Organic diisocyanate monomers useful in the method of this invention include 1,6-hexamethylene diisocyanate, tetramethylene diisocyanate, 1,12-dodecanediisocyanate, 1,4-cyclohexanediisocyanate, isophorone diisocyanate, methylene-bis-(cyclohexylisocyanate), 2-methylpentamethylene diisocyanate, m-tetramethylxylene diisocyanate, 2,4,4-trimethyl-hexamethylene diisocyanate, 2,4-toluene diisocyanate, 2,6-toluene diisocyanate, mixtures of the 2,4- and 2,6-toluene diisocyanate isomers, 4,4'-methylene-bis-(phenylisocyanate), 1,5-naphthalene diisocyanate, and the like.

Preferred difunctional compounds include polyethers, including polymers or copolymers of tetrahydrofuran, propylene oxide, butylene oxide, styrene oxide, epichlorohydrin, and the like; polyesters prepared from dicarboxylic acids such as succinic, glutaric, adipic, suberic, azelaic, phthalic, isophthalic, and the like, and diols such as ethylene glycol, propylene glycol, diethylene glycol, butylene glycol, 1,4-butanediol, 1,6-hexanediol, and the like; and polycaprolactones, polycarbonates, and polythioethers. Particularly preferred difunctional compounds are polyalkyleneether polyols having the general formula $HO(R^1O)_mH$, wherein $R^1$ is a $C_1$–$C_6$ alkylene radical and m is an integer large enough that the polyol has a number average molecular weight of at least about 250, e.g., when $R^1$ is tetramethylene or propylene, m is about 3 to about 90, preferably, about 9 to about 40. Such polyalkyleneether polyols are well-known, e.g., polytetramethylene ether glycol, polypropylene ether glycol, and the like, and can be prepared by the polymerization of cyclic ethers such as alkylene oxides, dihydroxyethers, and the like, using methods known in the art. Preferably, $R^1$ is tetramethylene and m is about 14.

Preferably, the molecular weight of the difunctional compound is about 650 to 3000, more preferably, about 1000.

The dispersion diol useful in this invention can be prepared by reacting one mole of a low molecular weight triol of the formula

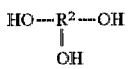

wherein $R^2$ is a linear or branched, $C_3$–$C_8$ alkyl, with the proviso that each oxygen attached to $R^2$ must be attached to a separate carbon atom, with one mole of a monoisocyanate of the formula

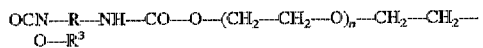

wherein R is as defined above, $R^3$ is $C_1$–$C_{18}$ alkyl, $C_3$–$C_8$ cycloalkyl, $C_6$–$C_{12}$ aryl or $C_7$–$C_{30}$ aralkyl, and n is a number between about 5 and 90, preferably, between about 15 to about 70, to produce a dispersion diol of the formula

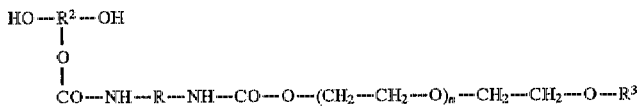

wherein R, $R^2$, $R^3$, and n are as defined above.

Preferably, R is $C_6$–$C_{12}$ aryl, $R^2$ is $C_3$–$C_6$ alkyl, $R^3$ is $C_1$–$C_4$ alkyl or oleyl ($C_{18}$), and n is about 15 to about 20. The triol and monoisocyanate are preferably used in stoichiometric measures.

Examples of triols useful in this invention include trimethylolethane [1,1,1-tris-(hydroxymethyl)-ethane], trimethylolpropane [2-ethyl-2-(hydroxymethyl)-1,3-propanediol], glycerine [1,2,3-propanetriol], and the like.

The monoisocyanate useful in the preparation of the dispersion diol, can be prepared by reacting one mole of a diisocyanate having the formula $R(NCO)_2$, wherein R is as defined above, with one mole of a monol (a compound with one —OH group) having repeating oxyethylene units represented by the structure

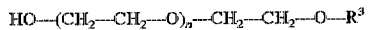

wherein $R^3$ and n are as described above, to produce the monoisocyanate of the formula

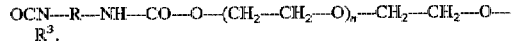

Commercially available monols include polyoxyethylene methyl ethers, sold under the tradename of Carbowax® (Union Carbide Corporation); polyoxyethylene reaction products of secondary alcohols sold under the tradename Tergitol® (Union Carbide Corporation); and polyoxyethylene phenols sold under the tradename Igepal® (Rhone-Poulenc).

The curative or chain extender useful in this invention can be any low molecular weight diamine. Examples of such compounds include but are not limited to ethylene diamine, 1,6-hexanediamine, piperazine, isophorone diamine, cyclohexane diamine, methylene bis (cyclohexylamine), xylene diamine, m-phenylene diamine, and the like. The curative or chain extender is useful for increasing the molecular weight of the prepolymer formed by the reaction of the organic diisocyanate, the difunctional compound, and the dispersion diol.

An optional component of the isocyanate-terminated polyurethane prepolymer is a compound comprising an ionizable moiety. For the purposes of this invention, the term "ionizable moiety" means a group capable of becoming ionic, i.e., capable of disassociating into ions or becoming electrically charged, such as, e.g., carboxylic acid groups or tertiary amino groups. The term "a compound comprising an ionizable moiety" means a compound comprising an ionizable moiety and at least two active hydrogens capable of reacting with the organic diisocyanate monomer. A preferred ionizable moiety is a carboxylic acid group (COOH) and preferred compounds comprising COOH groups are acids such as dimethylolpropionic acid. The compound comprising the ionizable moiety is typically added with a neutralizing agent. The neutralizing agent can be any tertiary amine, such as trimethylamine, triethylamine, tributylamine, dimethylethanolamine, methyldiethanol-amine, triethanolamine, and the like.

Other suitable additives and agents useful in polyurethane dispersion technology can be included in the method of this invention provided that such additives do not have a deleterious effect on the polyurethane produced. Such additives include co-solvents, coalescing aids, defoamers, and the like.

The isocyanate-terminated polyurethane prepolymer of this invention, can be prepared by reacting at least one organic diisocyanate monomer with the difunctional compound, the dispersion diol, and, optionally, the compound comprising an ionizable moiety, in amounts such that the NCO to OH equivalent ratio is from about 1.4:1 to about 2.1:1, preferably, about 1.6:1 to about 2.05:1, more preferably, about 1.7:1 to about 2.0:1.

Based on one equivalent of hydroxy-functional material (i.e., the combination of the difunctional compound, dispersion diol, and, if present, the compound comprising an ionizable moiety), the difunctional compound can be present in amounts of 0.25 equivalents to about 0.95 equivalents per equivalents of hydroxy-functional material, preferably, from about 0.30 equivalents to about 0.85 equivalents, more preferably, from about 0.35 to about 0.80 equivalents per equivalents of hydroxy-functional material.

The dispersion diol can be present in an amount ranging from about 0.05 to about 0.75 equivalents per equivalent of hydroxy-functional material, preferably, from about 0.15 to about 0.60 equivalents per equivalents of hydroxy-functional material, more preferably, from about 0.20 to 0.50 equivalents per equivalent of hydroxy-functional material.

The compound with an ionizable moiety can optionally be present in an amount from about 0.05 to about 0.50 equivalents, preferably, from about 0.10 to 0.45 equivalents, and more preferably, from about 0.15 to about 0.40 equivalents, per equivalent of hydroxy-functional material.

The isocyanate-terminated polyurethane prepolymer so prepared will comprise residual isocyanates in the range of about 2% to about 12%, preferably, from about 3% to about 11%, and more preferably, from about 4% to about 10%.

The polyurethane dispersion of this invention can be prepared by adding the prepolymer to water in shear emulsification mixing equipment, such as a Kady mill. The emulsification of the prepolymer in the water is facilitated by warming the prepolymer and/or by adding appropriate solvents, prior to adding the prepolymer to the water, to reduce the viscosity of the prepolymer. If the prepolymer comprises a compound comprising an ionizable moiety, such as dimethylolpropionic acid, the neutralizing agent can either be added to the prepolymer prior to adding the prepolymer to the water or the neutralizing agent can be added to the water immediately before addition of the prepolymer.

The amount of neutralizing agent added can vary from about 0.5 to about 1.0 equivalents per equivalent of acid, preferably, from about 0.6 to about 1.0 equivalents per equivalent of acid, and, more preferably, about 1.0 equivalent per equivalent of acid.

Once the prepolymer is emulsified in the water, the curative or chain extender is added immediately. The curative or chain extender can be prediluted with water or other appropriate solvent to facilitate addition and/or minimize exotherm. The amount of curative added should be calculated stoichiometrically based on the isocyanate content of the prepolymer. Any amount less than the stoichiometric level will permit the isocyanate to use water as the curative, leading to a reduction in physical properties of films formed from the dispersion.

The aqueous polyurethane dispersion of this invention is suitable for such end uses as coating, covering, or impregnating woven or non-woven textiles, leather, paper, wood, metal, ceramic, stone, concrete, bitumen, hard fiber, straw, glass, porcelain, various types of synthetic resins, glass fiber, or to produce antistatic and creases-resistant finishes. The aqueous polyurethane dispersions can also be used as binders for fleeces, adhesives, adhesifying agents, laminating agents, agents to render products hydrophobic, plasticizers or binders for such materials as corkmeal or sawdust, asbestos, paper materials, plastics, rubber waste, or ceramic materials, as auxiliary agents in clothprinting and in the paper industry, as adhesives for polymers, as sizing agents for glass fiber, or for finishing leather.

The aqueous polyurethane dispersion can be applied to a porous support, e.g., as a paste, which subsequently remains bonded to the finished product. Examples of such porous supports include woven or non-woven textiles, fiber mats, felts, fleeces, paper fleeces, foam plastic foils or split leather. These materials cause immediate solidification of the aqueous polyurethane dispersion because of the absorbent action of the materials. The materials are then dried at elevated temperature, and if necessary, pressed. Drying may also be carried out on smooth, porous or non-porous materials such as metal, glass, paper, cardboard, ceramic materials, sheet steel, silicone rubber, or aluminum foil. In these instances the finished sheet product is then lifted off and used or applied to a substrate by the reversal process by gluing, flame-laminating, or calendering. Application by the reversal process may be carried out at any time.

Vinyl polymers can be added to the aqueous polyurethane dispersion of this invention as active or inactive fillers. Examples of useful vinyl polymers include polyethylene, polypropylene, polyvinyl acetate, or ethylene/vinyl acetate copolymers which may be saponified or partly saponified and/or grafted with vinyl chloride, styrene/butadiene copolymers, ethylene graft copolymers, carbon black, silica, asbestos, talcum, kaolin, titanium dioxide, glass in the form of fiber or powder, and cellulose. The aqueous polyurethane dispersion can contain up to 70% of such vinyl polymers, based on the total quantity of dry substances, depending on the desired properties and/or use of the aqueous polyurethane dispersion.

Dyes, pigments, plasticizers, or additives that influence the flow properties of the aqueous polyurethane dispersion can also be added.

After the aqueous polyurethane dispersion has been applied to a substrate, the aqueous polyurethane dispersion can be dried at either room or elevated temperatures, depending on the chemical composition of the aqueous polyurethane dispersion, its moisture content, its drying time, and the thickness of the layer of the aqueous polyurethane dispersion on the substrate. The necessary drying conditions can be easily determined by preliminary testing. In all cases, the drying temperature must be below the solidification temperature of the aqueous polyurethane dispersion.

The substrates comprising the aqueous polyurethane dispersion can subsequently be coated with a protective finish to increase the resistance of the surface. Aqueous dispersions of solutions are again preferably used for this purpose.

Very hard polyurethanes can be obtained from finely divided aqueous polyurethane dispersions of this invention, which polyurethanes are suitable for use as storing lacquers and in some cases as air-drying lacquers. They combine the advantages of high hardness and elasticity with high gloss. When these polyurethanes are combined with aliphatic diisocyanates, the resultant combination also has high lightfastness and resistance to weathering.

The following examples are provided to illustrate the present invention.

EXAMPLES

Comparative Example A

Preparation of Dispersion Diol A According to U.S. Pat. No. 3,905,929

One mole of Carbowax MPEG 750 (Union Carbide), which is a condensation product of one mole of methanol (a monol) with about 16 moles of ethylene oxide, was reacted with excess 2,4-toluene diisocyanate at 80° C. in a reaction flask equipped with an agitator, nitrogen and heating mantle, for 120 minutes, to produce a reaction mixture. After the reaction was complete, the excess TDI was removed from the reaction mixture. One mole of the resultant reaction product was then reacted with one mole of diethanolamine at 30° C. for 90 minutes, to produce Dispersion Diol A.

Comparative Example B

Preparation of a Prepolymer A from the Dispersion Diol A

Two equivalents (262 grams) of methylene-bis-(cyclohexylisocyanate) were reacted with 0.5 equivalents (250 grams) polytetramethylene ether glycol of 1000 molecular weight and 0.5 equivalents (257 grams) of dispersion diol A, in a reaction flask equipped with an agitator, nitrogen and heating mantle, at 75° C. for 200 minutes, to a constant residual isocyanate content of 5.46%, to produce Prepolymer A. The residucal isocyanate content of the reaction mixture was determined by the dibutylamine titration method as described, e.g., in ASTM-D-1638.

Comparative Example C

Preparation of a Prepolymer B from Dispersion Diol A and Dimethylolpropionic Acid 1.75 equivalents (229.25 grams) of methylene-bis-(cyclohexylisocyanate) were reacted with 0.35 equivalents (175 grams) of polytetramethylene ether glycol of 1000 molecular weight, 0.25 equivalents (128.75 grams) of dispersion diol A, and 0.40 equivalents (26.8 grams) of dimethylolpropionic acid, at 85° C. in a reaction flask equipped with an agitator, nitrogen and heating mantle, for 200 minutes, to a constant residual isocyanate content of 5.62%, as determined by the dibutylamine titration method described above in Comparative Example B, to produce prepolymer B.

Example 1

Preparation of a Dispersion Diol 1

One mole of Carbowax® 750 was reacted with one mole of 2,4-toluenediisocyanate (TDI) at 80° C. in a reaction flask equipped with an agitator, nitrogen and heating mantle, for 120 minutes, to a constant residual isocyanate content of 4.5%, as determined by the dibutylamine titration method described above in Comparative Example B. One equivalent of the product so formed was subsequently reacted with three equivalents of trimethylolpropane (2-ethyl 2-(hydroxymethyl) 1,3-propanediol) at 80° C. for three hours in the presence of 50 ppm dibutyltindilaurate catalyst, to produce a dispersion diol (Dispersion Diol 1).

Example 2

Preparation of Prepolymer 1 from Dispersion Diol 1

Two equivalents (262 grams) of methylene-bis-(cyclohexylisocyanate) were reacted with 0.5 equivalents (250 grams) of polytetramethylene ether glycol of 1000 molecular weight and 0.5 equivalents (264.6 grams) of Dispersion Diol 1 at 80° C. in a reaction flask equipped with an agitator, nitrogen and heating mantle, for 200 minutes, to a constant residual isocyanate content of 5.40%, as determined by the dibutylamine titration method described above in Comparative Example B, to produce Prepolymer 1.

Example 3

Preparation of Prepolymer 2 from Dispersion Diol 1 and Dimethylolpropionic Acid 1.75 equivalents (229.25 grams) methylene-bis-(cyclohexylisocyanate) were reacted with 0.35 equivalents (175 grams) polytetramethylene ether glycol of 1000 molecular weight, 0.25 equivalents (132.3 grams) of dispersion diol 1, and 0.40 equivalents (26.8 grams) dimethylolpropionic acid at 80° C. in a reaction flask equipped with an agitator, nitrogen and heating mantle, for 200 minutes, to a constant residual isocyanate content of 5.59%, as determined by the dibutylamine titration method described above in Comparative Example B, to produce Prepolymer 2.

An accelerated aging test was performed on the prepolymer products of Comparative Examples B and C (Prepolymers A and B) and Examples 2 and 3 (Prepolymers 1 and 2), by heating the prepolymers in an oven at 70° C. or 100° C. Viscosity measurements were made at regular time intervals using a Brookfield Viscometer as an indication of prepolymer stability. Results are reported in Table 1 below.

TABLE 1

| Change in Viscosity vs Time | | | | |
|---|---|---|---|---|
| Prepolymer | A | B | 1 | 2 |
| Temperature (°C.) | 70 | 100 | 70 | 100 |
| Initial Viscosity (cps) | 70 | 160 | 50 | 120 |
| Viscosity after 4 hours | 105 | 250 | 50 | 120 |

TABLE 1-continued

| Change in Viscosity vs Time | | | | |
|---|---|---|---|---|
| Prepolymer | A | B | 1 | 2 |
| Viscosity after 8 hours (cps) | 140 | 480 | 70 | 156 |
| Viscosity after 24 hours (cps) | 720 | Thick | 90 | 240 |
| Viscosity after 48 hours (cps) | Thick | Gel | 140 | 400 |

As can be seen from the data in Table 1 above, the prepolymers of this invention (Prepolymers 1 and 2) showed lower viscosity for longer amounts of time. After 24 and 48 hour time periods, the prepolymer stability, as indicated by viscosity measurements, of Prepolymers 1 and 2 were still workable. After the same amount of time, the comparative prepolymers (Prepolymers A and B) had thickened and gelled beyond usability.

The results in Table 1 demonstrate that the prepolymers of the present invention (Prepolymers 1 and 2) are lower in viscosity and much more stable than the comparative prepolymers Prepolymers A and B.

Comparative Example D

Preparation of Polyurethane Dispersion A from the Prepolymer B

A polyurethane dispersion was prepared by adding 3.6 grams triethylamine to 117.4 grams of water in a dispersion mill. One hundred (100) grams of Prepolymer B that had been preblended with 6 grams of N-methyl pyrrolidone (NMP) at 90° C., was added to the dispersion mill under high speed emulsification. 8.0 grams of ethylenediamine predissolved in 50 grams water was added to the dispersion mill immediately after the emulsification of the triethylamine and Prepolymer B was completed (approximately 2 minutes). The high speed emulsification was then allowed to continue for about 15 minutes and then slowed to a mixing speed. The resultant polyurethane dispersion was then allowed to cook at 50° C. for two hours, to produce Polyurethane Dispersion A.

Example 4

Preparation of Polyurethane Dispersion 1 from Prepolymer 2

A polyurethane dispersion was prepared from the Prepolymer 2 as follows: 3.58 grams of triethylamine was added to 112.8 grams of water in a dispersion mill. One hundred (100) grams of Prepolymer 2 that had been preblended with 6 grams N-methyl pyrrolidone (NMP) at 90° C. was added under high speed emulsification. 7.89 grams of ethylenediamine predissolved in 50 grams of water was added immediately after the emulsification of the triethylamine and Prepolymer 2 was completed (approximately two minutes). The high speed emulsification was allowed to continue for 15 minutes and then slowed to a mixing speed. The resultant polyurethane dispersion was then allowed to cook at 50° C. for two hours, to produce Polyurethane Dispersion 1.

Films were prepared from Polyurethane Dispersion A and Polyurethane Dispersion 1. The films were tested according to ASTM D-412 (100% Modulus, 200% Modulus, Tensile and Elongation) and ASTM D-624 (Tear). The results are displayed in Table 2 below.

TABLE 2

Film Properties

| Polyurethane Dispersion | A | 1 |
|---|---|---|
| 100% Modulus, psi | 2600 | 2500 |
| 200% Modulus, psi | 3450 | 3200 |
| Tensile, psi | 3700 | 3850 |
| Elongation, % | 250 | 270 |
| Tear, pli | 620 | 650 |

The film made from the polyurethane dispersion of the present invention (Polyurethane Dispersion 1), was comparable, if not slightly better, than the film made from the comparative polyurethane dispersion (Polyurethane Dispersion A).

What is claimed is:

1. A process for producing a water-dispersible isocyanate-terminated polyurethane prepolymer, which comprises reacting:
   a) at least one organic diisocyanate monomer;
   b) a difunctional compound having a molecular weight of from about 250 to about 10,000 which is difunctionally reactive with the organic diisocyanate monomer and which is free of side chain polyoxyalkylene units; and
   c) a dispersion diol of the formula

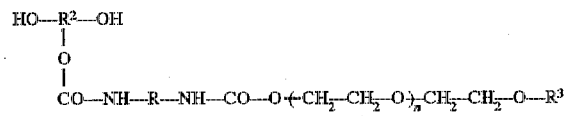

wherein R is a $C_4$–$C_{12}$ alkyl or alkenyl, a $C_6$–$C_{15}$ cycloalkyl, $C_7$–$C_{15}$ aralkyl, or a $C_6$–$C_{12}$ aryl; $R^2$ is a linear or branched, $C_3$–$C_8$ alkyl, with the proviso that each oxygen attached to $R^2$ must be attached to a separate carbon atom; $R^3$ is $C_1$–$C_{18}$ alkyl, $C_3$–$C_8$ cycloalkyl, $C_6$–$C_{12}$ aryl or $C_7$–$C_{30}$ aralkyl; and n is a number between about 5 and 90, to produce the water-dispersible isocyanate-terminated polyurethane prepolymer.

2. A process as recited in claim 1 which comprises reacting the organic diisocyanate monomer, the difunctional compound, and the dispersion diol, with a compound comprising an ionizable moiety.

3. A process as recited in claim 1 wherein the at least one organic diisocyanate monomer has the formula $R(NCO)_2$ wherein R is as described in claim 1.

4. A process as recited in claim 3 wherein the at least one organic diisocyanate monomer is selected from the group consisting of 1,6-hexamethylene diisocyanate, tetramethylene diisocyanate, 1,12-dodecanediisocyanate, 1,4-cyclohexanediisocyanate, isophorone diisocyanate, methylene-bis-(cyclohexylisocyanate), 2-methylpentamethylene diisocyanate, m-tetramethylxylene diisocyanate, 2,4,4-trimethylhexamethylene diisocyanate, 2,4-toluene diisocyanate, 2,6-toluene diisocyanate, mixtures of the 2,4- and 2,6-toluene diisocyanate isomers, 4,4'-methylene-bis-(phenylisocyanate), and 1,5-naphthalene diisocyanate.

5. A process as recited in claim 1 wherein the difunctional compound is selected from the group consisting of polyols, polyethers, polyesters prepared from dicarboxylic acids and diols, polycaprolactones, polycarbonates, and polythioethers.

6. A process as recited in claim 5 wherein the difunctional compound is a polyalkyleneether polyol of the formula $HO(R'O)_mH$, wherein R' is a $C_1$–$C_6$ alkylene radical and m is an integer large enough that the polyol has a number average molecular weight of at least about 250.

7. An isocyanate-terminated water-dispersible polyurethane prepolymer prepared as described in claim 1.

8. An isocyanate-terminated water-dispersible polyurethane prepolymer prepared as described in claim 2.

9. A method for preparing an aqueous polyurethane dispersion, which method comprises reacting a) a water-dispersible isocyanate-terminated polyurethane prepolymer as recited in claim 7; and b) a curative or chain-extender, in the presence of water, to produce the aqueous polyurethane dispersion.

10. A method for preparing an aqueous polyurethane dispersion, which method comprises reacting a) a water-dispersible isocyanate-terminated polyurethane prepolymer as recited in claim 8; and b) a curative or chain-extender, in the presence of water, to produce the aqueous polyurethane dispersion.

11. An aqueous polyurethane dispersion prepared as described in claim 9.

12. An aqueous polyurethane dispersion prepared as described in claim 10.

13. A process for producing a water-dispersible isocyanate-terminated polyurethane prepolymer, which comprises reacting:

a) at least one organic diisocyanate monomer having the formula $R(NCO)_2$ wherein R represents a $C_4$–$C_{12}$ alkyl or alkenyl, a $C_6$–$C_{15}$ cycloalkyl, $C_7$–$C_{15}$ aralkyl, or a $C_6$–$C_{12}$ aryl;

b) a polyalkyleneether polyol having the formula $HO(R^1O)_mH$, wherein $R^1$ is a $C_1$–$C_6$ alkylene radical and m is about 3 to about 90; and c) a dispersion diol having the formula

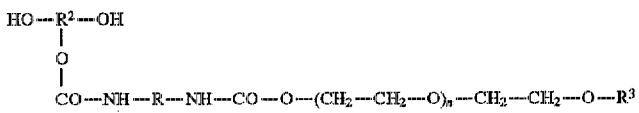

wherein R is as defined above; $R^2$ is a linear or branched, $C_3$–$C_8$ alkyl, with the proviso that each hydroxyl group must be attached to a separate carbon atom; $R^3$ is $C_1$–$C_{18}$ alkyl, $C_3$–$C_8$ cycloalkyl, $C_6$–$C_{12}$ aryl or $C_7$–$C_{30}$ aralkyl; and n is a number between about 5 and 90, to produce the water-dispersible isocyanate-terminated polyurethane prepolymer.

14. A process as recited in claim 13 wherein R is $C_6$–$C_{12}$ aryl, $R^1$ is tetramethylene or propylene, $R^2$ is $C_3$–$C_6$ alkyl, $R^3$ is $C_1$–$C_4$ alkyl or oleyl ($C_{18}$), m is about 9 to about 40, and n is about 15 to about 20.

15. A water-dispersible isocyanate-terminated polyurethane prepolymer prepared as described in claim 13.

16. A water-dispersible isocyanate-terminated polyurethane prepolymer prepared as described in claim 14.

17. A method for preparing an aqueous polyurethane dispersion, which method comprises reacting a) a water-dispersible isocyanate-terminated polyurethane prepolymer as recited in claim 15; and b) a curative or chain-extender, in the presence of water, to produce the aqueous polyurethane dispersion.

18. A method for preparing an aqueous polyurethane dispersion, which method comprises reacting a) a water-dispersible isocyanate-terminated polyurethane prepolymer as recited in claim 16; and b) a curative or chain-extender, in the presence of water, to produce the aqueous polyurethane dispersion.

19. A process as recited in claim 1 wherein R is $C_6$–$C_{12}$ aryl, $R^2$ is $C_3$–$C_6$ alkyl, $R^3$ is $C_1$–$C_4$ alkyl or oleyl ($C_{18}$), and n is about 15 to about 20.

20. A water-dispersible isocyanate-terminated polyurethane prepolymer prepared as described in claim 19.

21. A method for preparing an aqueous polyurethane dispersion, which method comprises reacting a) a water-dispersible isocyanate-terminated polyurethane prepolymer as recited in claim 20; and b) a curative or chain-extender, in the presence of water, to produce the aqueous polyurethane dispersion.

* * * * *